United States Patent [19]

Lamarche

[11] 4,279,132
[45] Jul. 21, 1981

[54] VIBRATION DAMPER ASSEMBLY

[75] Inventor: Paul E. Lamarche, Utica, Mich.

[73] Assignee: Borg-Warner Corporation, Chicago, Ill.

[21] Appl. No.: 951,823

[22] Filed: Oct. 16, 1978

[51] Int. Cl.³ .......................... F16D 3/14; F16D 47/02
[52] U.S. Cl. ..................................... 64/27 C; 64/27 F; 192/106.2
[58] Field of Search ................... 64/27 C, 27 F, 27 R; 192/106.1, 106.2

[56] References Cited

U.S. PATENT DOCUMENTS

| | | | |
|---|---|---|---|
| 608,770 | 8/1898 | Godfray | 64/27 C |
| 1,192,731 | 7/1916 | Batchhelder | 64/27 C |
| 2,005,655 | 6/1935 | Havill | 64/27 C |
| 2,149,887 | 3/1939 | Hickman | 64/27 C |
| 2,210,074 | 8/1940 | Friedman | 192/106.2 |
| 2,574,573 | 11/1951 | Libby | 64/27 C |
| 2,632,318 | 3/1953 | Meyer | 64/27 C |
| 3,327,820 | 6/1967 | Maurice | 192/106.2 |
| 4,002,043 | 1/1977 | Yoshida | 64/27 C |
| 4,139,995 | 2/1979 | Lamarche | 64/27 C |
| 4,188,805 | 2/1980 | Fall et al. | 64/27 C |
| 4,188,806 | 2/1980 | Fall et al. | 64/27 C |

FOREIGN PATENT DOCUMENTS 166939 of 0000 United Kingdom .................... 64/27 C Primary Examiner—Ira S. Lazarus
Attorney, Agent, or Firm—James A. Geppert

[57] ABSTRACT

A vibration damper assembly providing for extended travel in the damper operation, wherein the assembly includes a hub having an integral radial flange and three circumferentially equally spaced radially extending hub arms, a pair of equalizers journalled on the hub on opposite sides of the flange, and a housing substantially enclosing the hub and equalizers and adapted to be secured to a torque input member. Each equalizer has three circumferentially equally spaced radially extending arms, with the arms of the two equalizers alternating between the hub arms. This assembly provides for three groups of damper springs acting in parallel with three spring sets acting in series in each group.

13 Claims, 6 Drawing Figures

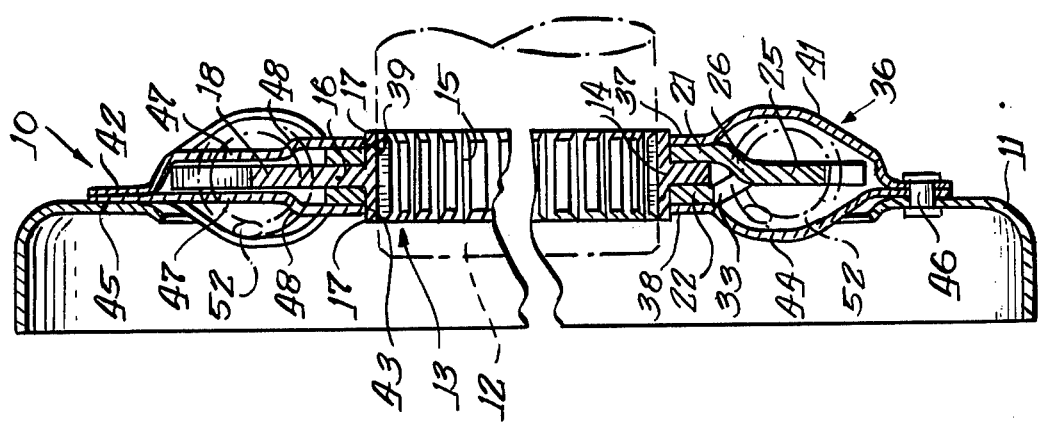
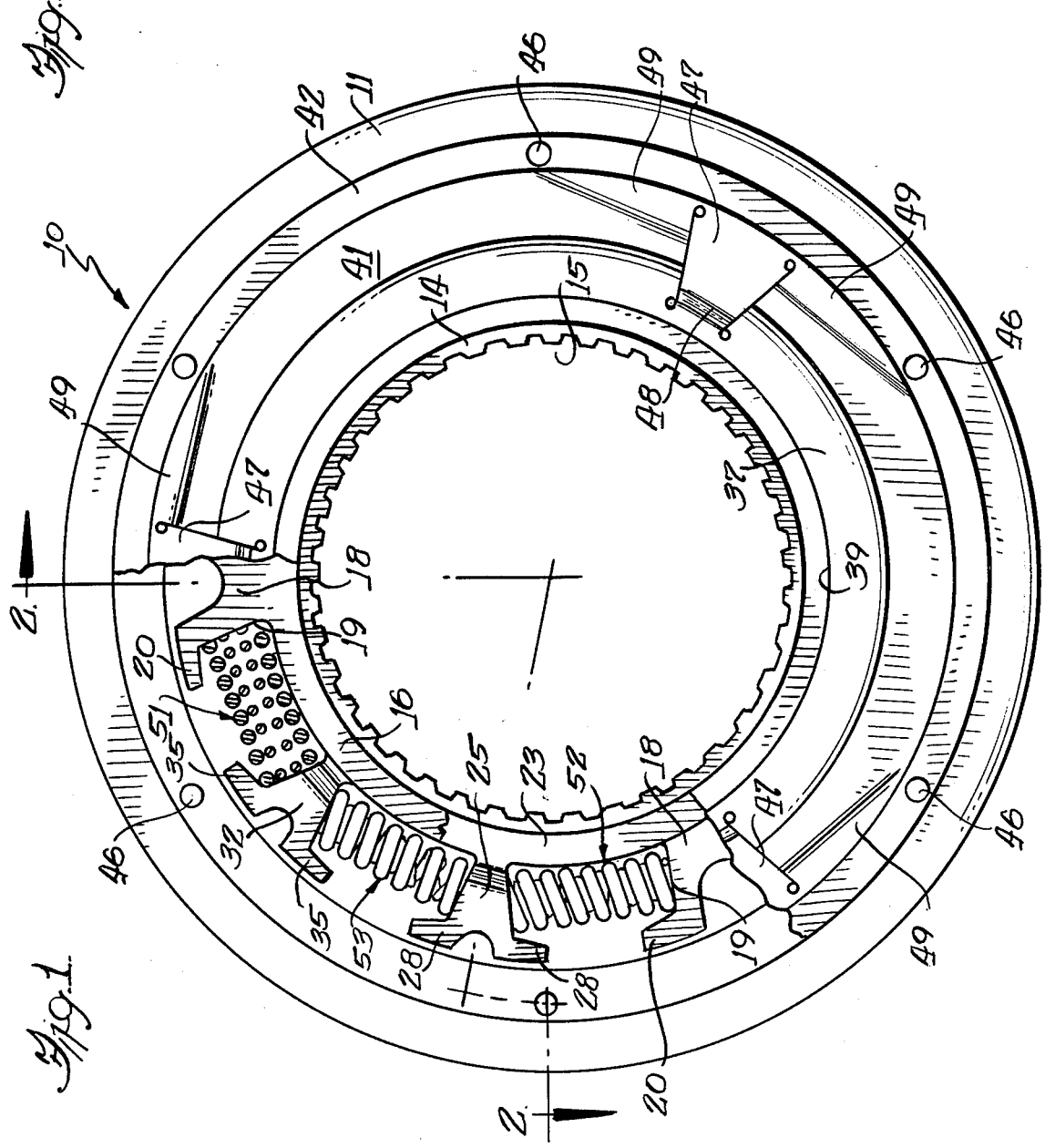

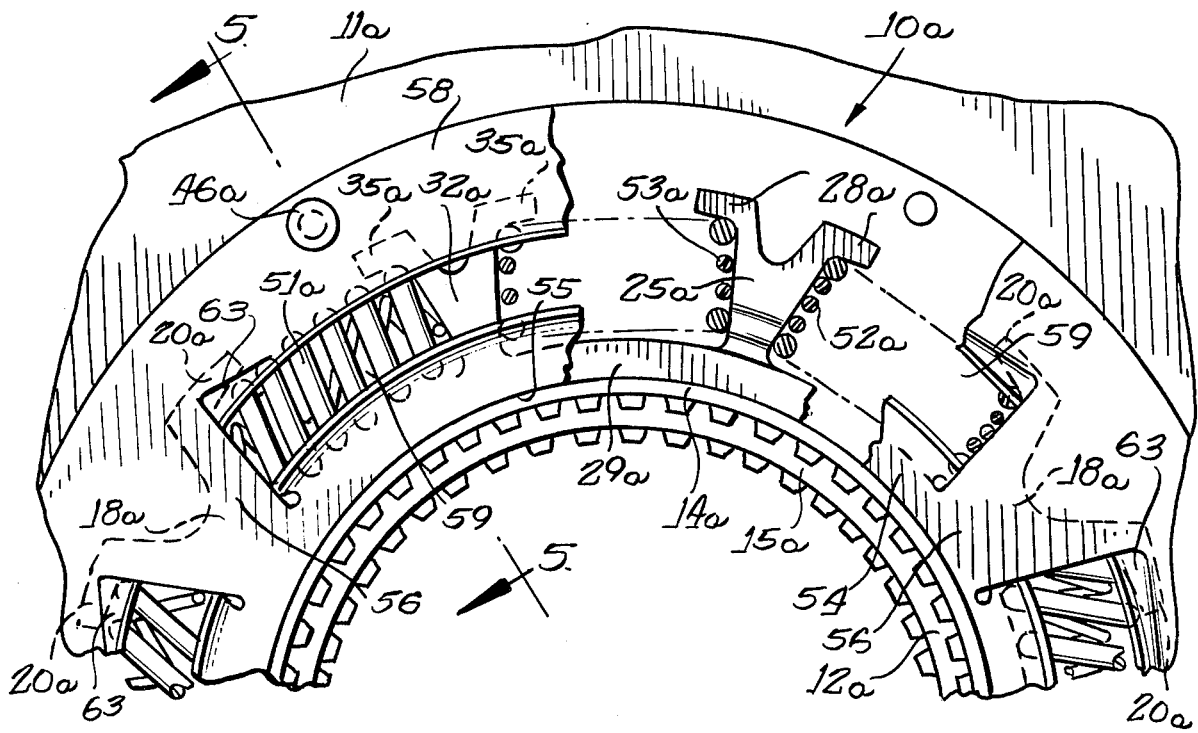
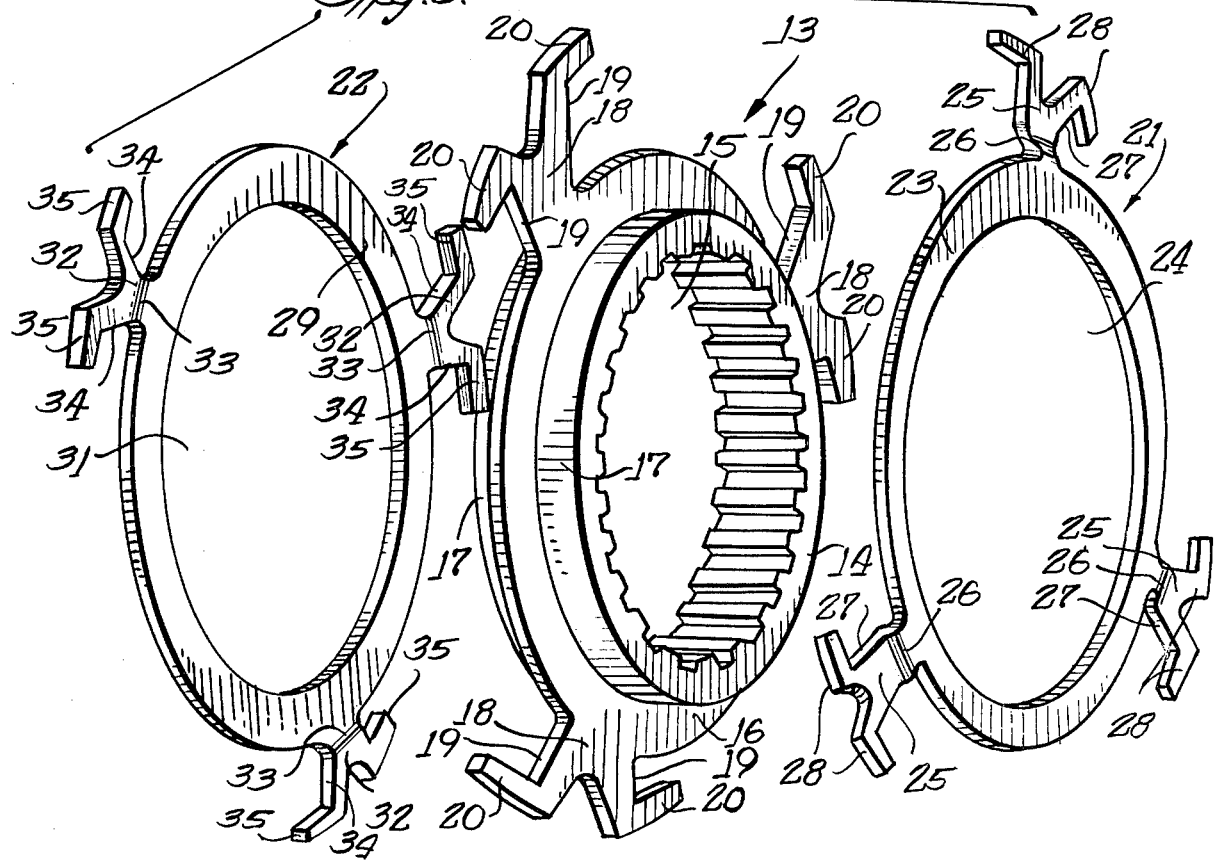

VIBRATION DAMPER ASSEMBLY

BACKGROUND OF THE INVENTION

A vibration damper assembly is conventionally utilized for a clutch assembly in the drive train between an automotive engine and a manual transmission to neutralize any torsional vibrations emanating from the engine. Although a torque converter for an automotive automatic transmission normally does not require a vibration damper as undesirable vibrations are hydraulically dampened in the converter, if a lock-up clutch is inserted in the torque converter to provide a direct drive between the impeller and turbine at higher speeds, vibrations again become a problem.

To overcome the problem of undesirable vibrations in the drive train, the present invention provides a vibration damper assembly having the capability of extended travel through the use of groups of springs arranged to operate in parallel.

SUMMARY OF THE INVENTION

The present invention relates to an improved vibration damper assembly for use in a torsional coupling between torque input and output members, such as in a vehicle clutch for a manual transmission or a lock-up clutch for a torque converter, wherein three groups of damper springs are arranged in parallel with three sets of springs in each group acting in series. The vibration damper provides for a relatively high amplitude damping at a low spring rate.

The present invention also relates to an improved vibration damper assembly comprising a hub adapted to be connected to torque output means and having a centrally positioned flange with three circumferentially spaced radial arms extending therefrom, a pair of equalizers journalled on the hub at opposite sides of the flange, each equalizer having three circumferentially spaced radial arms, and a housing substantially enclosing the hub and equalizers and attached to suitable torque input means. The arms of each equalizer are offset inwardly to lie in the same plane as the hub arms and arranged alternately between adjacent hub arms.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a rear elevational view with portions broken away of a vibration damper assembly of the present invention.

FIG. 2 is a cross sectional view taken on the irregular line 2—2 of FIG. 1.

FIG. 3 is an exploded perspective view of the vibration damper hub and equalizers.

FIG. 4 is an enlarged partial front elevational view of an alternate version of vibration damper.

DESCRIPTION OF THE PREFERRED EMBODIMENTS

Figure 5:
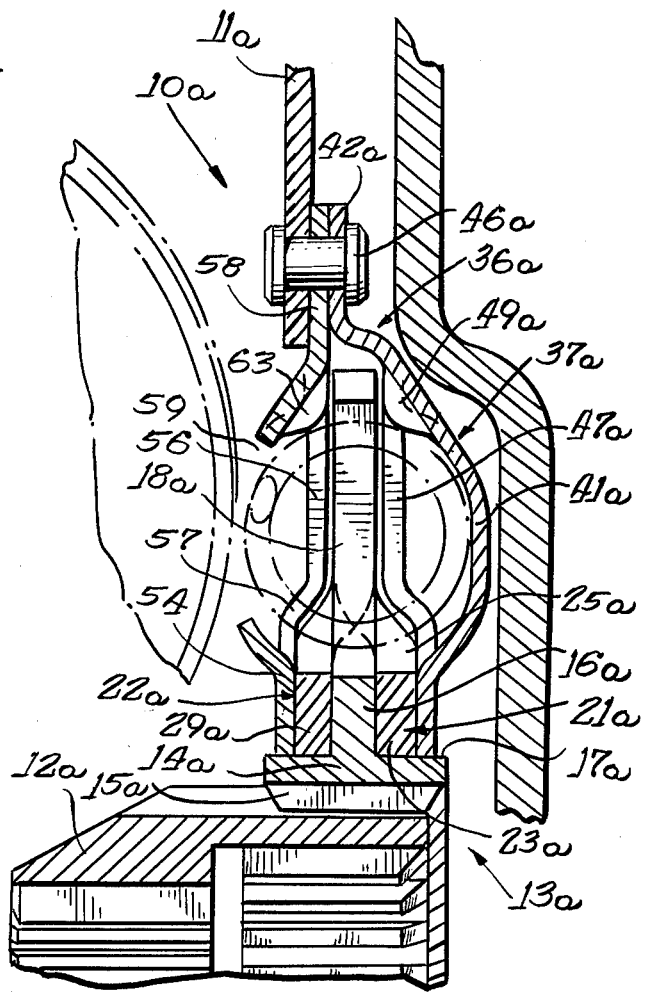
FIG. 5 is a partial cross sectional view taken on the line 5—5 of FIG. 4.

Referring more particularly to the disclosure in the drawings wherein are shown illustrative embodiments of the present invention, FIGS. 1 through 3 disclose a vibration damper assembly 10 adapted to be connected to a suitable torque input means 11 and acting to drive a torque output means 12, such as a transmission input shaft of either the manual or automatic variety. The vibration damper assembly 10 includes a hub 13 having a barrel 14 with a central splined opening 15 to receive the splined end of shaft 12, a radial flange 16 centrally located on the barrel 14 to provide a pair of shoulders 17, and three circumferentially equally spaced radial arms 18 extending from the flange; each arm having outwardly diverging edges 19 terminating in a pair of circumferentially oppositely extending fingers 20.

Journalled on the shoulders 17 on opposite sides of the hub flange 16 are a pair of floating equalizers 21 and 22. The equalizer 21 has an annular flat body 23 closely adjacent the flange 16 with a central opening 24 and three circumferentially equally spaced arms 25 extending radially outwardly from the periphery of the body 23. Each arm is offset inwardly at 26 adjacent the body so that the outer portion of the arm will lie in the same plane as the hub arms 18. Each equalizer arm 25 has outwardly diverging edges 27 terminating in circumferentially oppositely extending fingers 28.

The equalizer 22 is a substantial mirror image of equalizer 21 having an annular flat body 29 with a central opening 31, three circumferentially equally spaced radial arms 32 offset at 33, so that the major portion of each arm 32 lies in the same plane as the hub arms 18 and the arms 25 of equalizer 21; each arm 32 having outwardly diverging edges 34 terminating in fingers 35.

A damper housing or cover 36 consists of a pair of cover plates 37 and 38, the rear plate 37 having a central opening 39 receiving a shoulder 17; the plate being closely adjacent the equalizer body 22. An outwardly bulged generally imperforate portion 41 on the plate 37 generally encompasses the damper springs and terminates in an inwardly offset radial flange 42. The front plate 38 has a central opening 43 receiving the opposite shoulder 17 and is provided with an outwardly bulged imperforate portion 44 terminating in an annular flange 45 abutting the input means 11; and the flanges 42 and 45 abut and are secured to the input means 11 by suitable means such as rivets 46.

Stamped out of each of the plates 37 and 38 are three circumferentially equally spaced and inwardly disposed drive arms or straps 47 having inward offsets 48 so that the straps 47 lie closely adjacent the hub arms 18. The straps 47 of the two plates are axially aligned and formed in the bulged portions 41 and 44. Adjacent the cutouts are formed oppositely extending inclined or re-entry ramps 49,49 acting to retain the damper springs in position and to prevent outward movement of the springs when the housing 36 moves relative to the hub arms 18.

Three groups of spring sets 51,52,53 act in parallel between the hub arms 18 and the equalizer arms 25 and 32. When the equalizers 21 and 22 are positioned on the shoulders 17,17 on opposite sides of the hub flange 16, the arms of the two equalizers alternate; thus in counterclockwise rotation, looking at FIG. 1, a hub arm 18 is followed by an equalizer arm 32, then an equalizer arm 25 followed by a second hub arm 18; all of the hub arms and equalizer arms lying in the same plane.

As disclosed in the prior patent applications Ser. Nos. 801,989 now U.S. Pat. No. 4,188,805; 801,990; 860,348 now U.S. Pat. No. 4,188,806 and 865,082 now U.S. Pat.

No. 4,139,995; the springs for the damper are arranged in groups acting in parallel, with the springs in each group acting in series. In the present application, three groups of springs 51,52,53 act in parallel, with the three spring sets of each group acting in series. Thus, where the torque input means 11 is rotated due to the application of torque by a lock-up clutch in a torque converter, a friction clutch for a manual transmission, etc., rotation of the means 11 causes rotation of the housing 36 and drive straps 47. The drive straps engage the spring sets 51 to compress these springs and move them against arms 32 of equalizer 22 compressing spring sets 53, moving spring sets 53 against arms 25 of equalizer 21 to compress spring sets 52, which in turn move against the arms 18 of the hub to cause rotation of the output means 12.

Although, the spring sets in each group can have different rates or all the same rate, a preferred arrangement is to have the spring sets 51 and 52 of identical rates with the spring set 53 of a higher rate. Thus, the spring sets 51 and 52 would be compressed equally under the application of torque until they reached their solid heights, while the spring sets 53 would be compressed to a lesser extent than the spring sets 51 and 52. Obviously, the amount of compression of the spring sets depends on the resistance of the output means to rotation.

Figure 6:
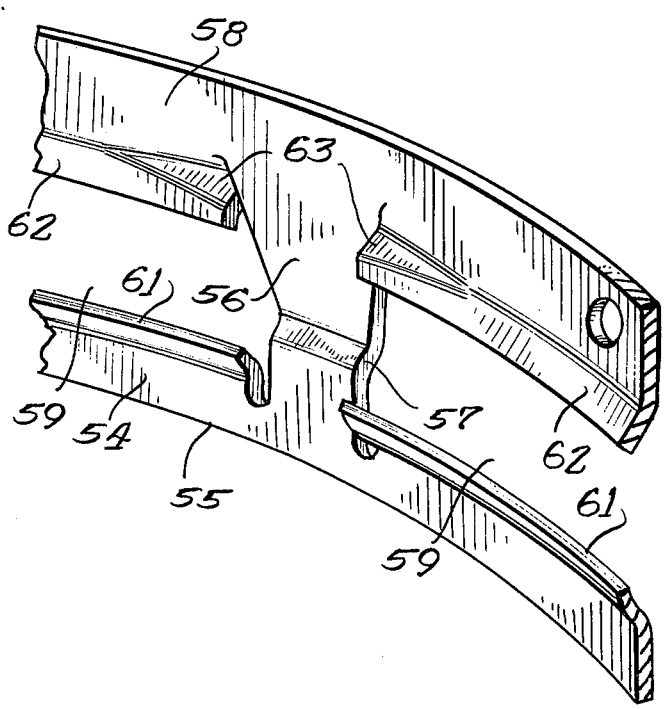
FIG. 6 is an enlarged perspective view of a portion of the housing for FIGS. 4 and 5.

FIGS. 4 through 6 disclose an alternate embodiment of vibration damper wherein identical parts will have the same reference numeral with the addition of a script a. The damper assembly 10a includes a torque input means 11a, torque output means 12a, a hub 13a having a barrel 14a with a splined opening 15a, a radial flange 16a and three spaced hub arms 18a having diverging edges terminating in fingers 20a, and a pair of equalizers 21a, 22a. The equalizer 21a includes an annular body 23a journalled on a shoulder 17a of the hub and three radial arms 25a with circumferentially extending fingers 28a. Also, the equalizer 22a similarly has an annular body 29a journalled on the opposite shoulder 17a with three radial arms 32a terminating in fingers 35a. The arms 25a and 32a of the equalizers are offset in opposite directions so as to lie in the same plane as the hub arms 18a.

The damper cover 36a includes a rear plate 37a journalled on one shoulder 17a with a bulged portion 41a terminating in a radial flange 42a. However, the front plate 54 has a central opening 55 journalled on the opposite shoulder 17a and is provided with three circumferentially spaced radially extending arms 56 offset at 57 to lie closely adjacent and generally parallel to the hub arms 18a. The arms terminate in an annular flange 58 sandwiched between the input means 16a and the flange 42a, the flanges 42a and 58 being secured to the input means 11a by rivets 46a or other suitable means.

The arms 56 define three arcuate elongated openings or slots 59 in the plate, with the periphery of the plate 54 having upwardly and outwardly inclined arcuate lips 61, while outwardly and downwardly inclined arcuate lips 62 extend from the inner periphery of the annular flange 58. The arms 56 are axially aligned with the drive straps 47a in the plate 37a and act as drive straps for the assembly. Spring sets 51a,52a,53a are positioned between the hub arms 18a and the equalizer arms 25a and 32a and act in parallel as in the previous embodiments.

The slots 59 are provided in the front plate 54 where space is a problem as shown in FIG. 5; the adjacent structure preventing the use of a full bulged wall portion. Also, adjacent each arm 56, the outer lips 62 are provided with inclined ramps 63,63 which act in the same manner as the ramps 49a formed in the cover plate 37a. This assembly operates in the same manner as that of the first embodiment of FIGS. 1 through 3.

I claim:

1. A vibration damper assembly to transmit torque between driving and driven members, comprising an input member operatively connected to torque input means, a hub operatively connected to torque output means and having three circumferentially equally spaced radial arms, a pair of equalizers journalled on opposite sides of and floating independently of said hub, each equalizer including an annular plate have three circumferentially equally spaced radial arms, said arms of said equalizers alternating between each adjacent pair of hub arms, compression spring sets interposed between said hub arms and equalizer arms to form three groups of spring sets acting in parallel with each group having three spring sets acting in series, and a pair of cover plates substantially enclosing said hub, equalizers and spring sets and operatively connected to said input member, each cover plate having three circumferentially equally spaced integral drive means therein interposed in the path of the spring sets.

2. A vibration damper assembly as set forth in claim 1, in which the arms of each equalizer plate are inwardly offset so as to lie in the same plane as the hub arms.

3. A vibration damper assembly as set forth in claim 1, in which said drive means comprise drive straps stamped out of each cover plate axially aligned with and generally parallel to each hub arm.

4. A vibration damper assembly as set forth in claim 1, in which each hub arm and each equalizer arm has outwardly diverging edges terminating in circumferentially oppositely extending fingers.

5. A vibration damper assembly as set forth in claim 1, in which each cover plate has a flat annular central portion and an outwardly bulged portion terminating in a radial flange, said flanges of said cover plates abutting and secured to said input member.

6. A vibration damper assembly as set forth in claim 3, including inclined re-entry ramps formed in the cover plates adjacent the outer ends of each drive strap.

7. A vibration damper assembly as set forth in claim 1, in which said hub includes a barrel with a central radial flange dividing the barrel into a pair of shoulders upon which are journalled the equalizers and cover plates.

8. A vibration damper assembly as set forth in claim 1, in which an arm of each equalizer is positioned between adjacent hub arms.

9. A vibration damper assembly as set forth in claim 1, in which the rear cover plate comprises a flat central annular portion and an outwardly bulged portion terminating in a radial flange, and three circumferentially equally spaced drive straps integral with said cover plate and offset inwardly to be adjacent and in axial alignment with said hub arms, and said front cover plate comprising a flat annular central portion and a concentric annular flange joined by three circumferentially equally spaced arms to define three elongated arcuate slots, said arms being axially aligned with the hub arms and drive straps.

10. A vibration damper assembly as set forth in claim 9, including three arcuate upwardly and outwardly inclined lips on said annular central portion and three arcuate downwardly and outwardly inclined lips on said flange, said arcuate lips acting to retain the spring sets in the cover.

11. A vibration damper assembly as set forth in claim 1, in which said hub includes a barrel and a central radial flange from which said hub arm extend, the arms of each equalizer being inwardly offset to lie in common plane with the hub arms, said hub arms and equalizer arms each having outwardly diverging edges terminating in circumferentially oppositely extending fingers, an arm of each equalizer being positioned between adjacent hub arms, said cover plates each comprising a flat annular central portion and an outwardly bulged portion terminating in a radial flange secured to said input means, said drive means comprising three circumferentially equally spaced drive straps formed integral with each cover plate and inwardly offset to generally parallel and be axially aligned with said hub arms, and inclined re-entry ramps formed in each coverplate adjacent the outer end of each drive strap.

12. A vibration damper assembly as set forth in claim 11, in which at least one bulged portion of a cover plate is cut away between the drive straps to form three arcuate elongated slots extending between the drive straps.

13. A vibration damper assembly as set forth in claim 12, including inner and outer arcuate inclined lips defining said slots and retaining the spring sets in the assembly.

* * * * *